(12) United States Patent
Ebrahimi et al.

(10) Patent No.: US 8,626,703 B2
(45) Date of Patent: Jan. 7, 2014

(54) ENTERPRISE RESOURCE PLANNING (ERP) SYSTEM CHANGE DATA CAPTURE

(75) Inventors: Fari Ebrahimi, Basking Ridge, NJ (US);
Shankar Harihara, Irving, TX (US);
Walid Hassan, Irving, TX (US); Tereasa Walker, Buena Vista, CO (US); Thillai Ponnambalam, Irving, TX (US); Solleti Prakash Sreekanth, Secunderabad (IN);
Indu Mohan Babu Nori, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 293 days.

(21) Appl. No.: 12/971,483

(22) Filed: Dec. 17, 2010

(65) Prior Publication Data

US 2012/0158642 A1 Jun. 21, 2012

(51) Int. Cl.
*G06F 7/00* (2006.01)
*G06F 17/00* (2006.01)

(52) U.S. Cl.
USPC ........................................................ 707/600

(58) Field of Classification Search
USPC ........................................................ 707/600
See application file for complete search history.

(56) References Cited

U.S. PATENT DOCUMENTS

| 7,143,099 | B2* | 11/2006 | Lecheler-Moore et al. ........ 1/1 |
| 2004/0010496 | A1* | 1/2004 | Behrendt et al. ................ 707/10 |
| 2004/0133551 | A1* | 7/2004 | Linstedt ............................ 707/1 |
| 2005/0154742 | A1* | 7/2005 | Roth et al. ..................... 707/100 |
| 2006/0282350 | A1* | 12/2006 | Lind et al. ...................... 705/29 |
| 2007/0136352 | A1* | 6/2007 | Chape et al. .................. 707/102 |
| 2007/0143301 | A1* | 6/2007 | Tran .............................. 707/10 |
| 2007/0156835 | A1* | 7/2007 | Pulkowski et al. ........... 709/207 |
| 2008/0120159 | A1* | 5/2008 | Cidela et al. ..................... 705/8 |

* cited by examiner

*Primary Examiner* — Shyue Jiunn Hwa
*Assistant Examiner* — Muluemebet Gurmu

(57) ABSTRACT

A device receives, from a data warehouse, a request for incremental data, creates one or more temporary tables based on the request, and extracts incremental data from tracking tables of an enterprise resource planning (ERP) system. The device also stores the extracted incremental data in the one or more temporary tables, and joins the one or more temporary tables with one or more regular tables, where the one or more regular tables include data associated with the incremental data stored in the one or more temporary tables. The device further retrieves data from the joined one or more temporary tables and the one or more regular tables, and stores the retrieved data in the data warehouse.

17 Claims, 9 Drawing Sheets

ENTERPRISE RESOURCE PLANNING (ERP) SYSTEM CHANGE DATA CAPTURE

BACKGROUND

An enterprise resource planning (ERP) system is an integrated computer-based system used to manage internal and external resources, such as tangible assets, financial resources, materials, human resources, etc. ERP systems facilitate the flow of information between all business functions inside boundaries of an organization and manage connections to outside stakeholders of the organization. Built on a centralized database (e.g., a data warehouse) and typically utilizing a common computing platform, ERP systems consolidate all business operations into a uniform and enterprise-wide system environment. An ERP system can either reside on a centralized server or be distributed across modular hardware and software units that provide services and communicate on a local area network (LAN). The distributed design allows a business to assemble modules from different vendors without a need for placement of multiple copies of complex and expensive computer systems in areas which will not use their full capacity.

One example of an ERP is a "SAP system," available from the German software corporation SAP AG. ERP systems, such as SAP, may generate millions of rows of records every day. However, these ERP systems do not enable underlying data (e.g., and data structures) to be exposed to an external data warehouse through a gateway. This makes it difficult to obtain, from the ERP system, newly created data, changed data, or an indication that data has been deleted (e.g., referred to collectively herein as "incremental data") when incremental data becomes available. Without such up-to-date information, an organization may not be able to make informed decisions or be quickly alerted to changing conditions in the organization, such as through the use of third party analytic software.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a change (or incremental) data capture system (e.g., for an ERP system) that extracts information (e.g., incremental data) from the ERP system on an as needed basis and populates a data warehouse with the extracted information. The data warehouse may utilize the extracted information to create specific reports and/or analytics that provide up-to-date information to businesses and enables them to make prompt decisions. The ERP system (e.g., a source system) may have data (e.g., incremental data) that has changed from a previous point in time, and the data warehouse (e.g., a target system or reporting system) may need to take action based on the changed data. The systems and/or methods may provide a link between the source system (e.g., the ERP system) and the target system (e.g., the data warehouse) so that the target system may reflect the newest up-to-date data from the source system.

In SAP-based ERP systems, the SAP system sends data to an external data warehouse using a "push" technology. In contrast, the systems and/or methods described herein may use a knowledge module (e.g., an Oracle Data Integrator (ODI)) to "pull" data from an ERP system and into a data warehouse, which may provide flexibility and control to the data warehouse. This may alleviate having to make changes in the ERP system (or target system) for any data mapping, adding new columns, data transfer times, etc. since all changes may be performed in a target system environment that does not require use of specific programming (e.g., Advanced Business Application Programming (ABAP)) expertise supported by the ERP system. With the systems and/or methods there is no need to utilize ERP system specialists (e.g., SAP specialists) or ABAP programmers to maintain, change, or enhance the reporting system.

Figure 1:
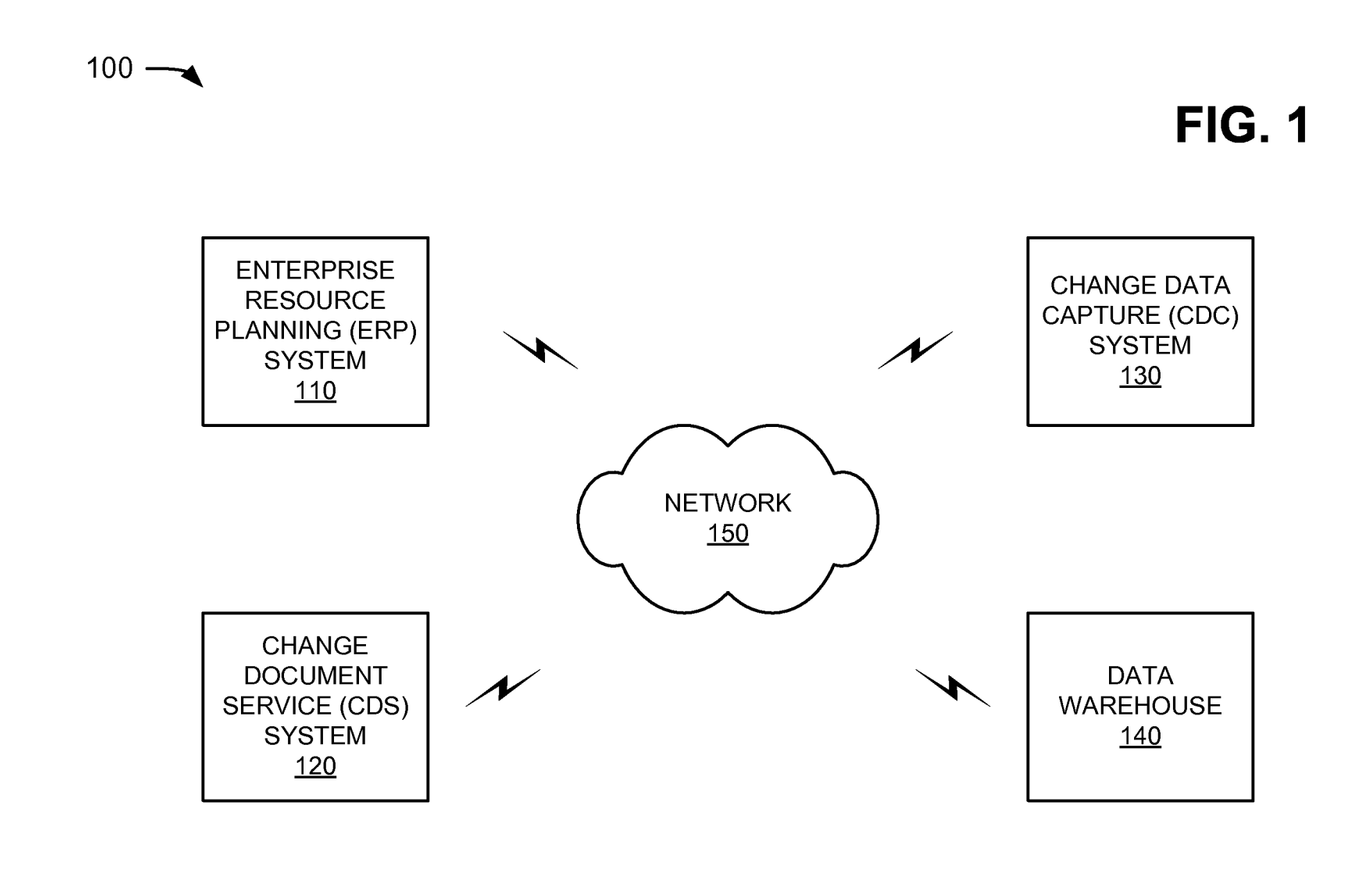
FIG. 1 is a diagram of an example network in which systems and/or methods described herein may be implemented.

FIG. 1 is a diagram of an example network 100 in which systems and/or methods described herein may be implemented. As illustrated, network 100 may include an enterprise resource planning (ERP) system 110, a change document service (CDS) system 120, a change data capture (CDC) system 130, and a data warehouse 140 interconnected by a network 150. Components of network 100 may interconnect via wired and/or wireless connections. A single ERP system 110, CDS system 120, CDC system 130, data warehouse 140, and network 150 have been illustrated in FIG. 1 for simplicity. In practice, there may be more ERP systems 110, CDS systems 120, CDC systems 130, data warehouses 140, and/or networks 150. Also, in some instances, one or more of the components of network 100 may perform one or more functions described as being performed by another one or more of the components of network 100.

ERP system 110 may include one or more server devices, or other types of computation or communication devices, that gather, process, search, and/or provide information in a manner described herein. In one example implementation, ERP system 110 may include one or more devices that manage internal and external resources (e.g., of an organization), such as tangible assets, financial resources, materials, human resources, etc. ERP system 110 may facilitate the flow of information between all functions (e.g., manufacturing, accounting, business planning, etc.) of an organization, and may manage connections to outside stakeholders of the organization. ERP system 110 may consolidate an organization's operations into a uniform and enterprise-wide system environment. In one example, ERP system 110 may include a centralized server device. In another example, ERP system 110 may be distributed across multiple server devices that provide services and communicate on a LAN. In one implementation, ERP system 110 may include a SAP-based ERP system.

CDS system 120 may include one or more server devices, or other types of computation or communication devices, that gather, process, search, and/or provide information in a manner described herein. In one example implementation, CDS system 120 may include one or more devices that determine when data is created, changed, or destroyed (e.g., incremental data is generated) in ERP system 110 over a particular time period, and insert the incremental data in one or more tables for tracking purposes. For example, in SAP-based systems, CDS system 120 may insert the incremental data into two tables for tracking, a change document header (CDHDR) table and a change document position (CDPOS) table. Although FIG. 1 shows CDS system 120 as being separate from ERP system 110, in other implementations, CDS system 120 may be incorporated within ERP system 110.

CDC system 130 may include one or more server devices, or other types of computation or communication devices, that gather, process, search, and/or provide information in a manner described herein. In one example implementation, CDC system 130 may include one or more devices that extract information (e.g., incremental data) from ERP system 110 on an as needed basis, and populate data warehouse 140 with the extracted information. In one example, CDC system 130 may extract or pull the incremental data from ERP system 110 according to a pre-defined schedule (e.g., daily) that may be defined by a user (e.g., a network administrator) of CDC system 130. CDC system 130 may identify changes in ERP system 110 (e.g., incremental data) via a variety of mechanisms, such as the CDHDR and CDPOS tables, timestamps on rows of data, version numbers on rows of data, status indicators on rows of data, and/or a combination of the aforementioned.

In one implementation, CDC system 130 may receive, from data warehouse 140, a request for incremental data, and may create one or more temporary tables for storing incremental data. CDC system 130 may extract incremental data from ERP system 110, and may store the extracted incremental data in the temporary table(s). CDC system 130 may generate a function call to join the temporary table(s) with one or more regular tables (e.g., that include data relevant to the incremental data provided in the temporary table(s)), and may retrieve data from the joined temporary table(s) and regular table(s). CDC system 130 may store the retrieved data in data warehouse 140 (e.g., so that data warehouse 140 may provide reports based on the retrieved data), and may remove the temporary table(s). In one example, CDC system 130 may generate notifications (e.g., emails to multiple email addresses, text messages to cell phone numbers, etc.) that provide a status or progress of an incremental data capture from ERP system 110.

Data warehouse 140 may include one or more server devices, or other types of computation or communication devices, that gather, process, search, and/or provide information in a manner described herein. In one example implementation, data warehouse 140 may include one or more databases of information that may be used for reporting (e.g., to an organization). Data warehouse 140 may maintain functions in a staging layer, an integration layer, and/or an access layer. The functions may be provided in data warehouse 140 in order to meet an organization's reporting needs. The staging layer may store raw data for use by developers (e.g., for analysis and support). The integration layer may integrate data, and the access layer may enable data to be provided to users (e.g., members of an organization). Data warehouse 140 may clean data, transform data, catalogue data, and make data available for use by members of an organization (e.g., for data mining, online analytical processing, market research and decision support, etc.). Data warehouse 140 may include business intelligence tools; tools to extract, transform, and load data into databases; and tools to manage and retrieve metadata.

Network 150 may include a LAN, a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks.

Although FIG. 1 shows example components of network 100, in other implementations, network 100 may contain fewer components, different components, differently arranged components, or additional components than depicted in FIG. 1. Although systems and/or methods are described herein in connection with SAP-based ERP systems, in other implementations, the systems and/or methods described herein may be applied to other types of ERP systems and/or to systems other than ERP systems (e.g., Financials and Controlling (FICO) systems, Human Resources (HR) systems, Materials Management (MM) systems, Sales & Distribution (SD) systems, Production Planning (PP) systems, Plant Maintenance (PM) systems, Quality Management (QM) systems, Supplier Relationship Management (SRM) systems, etc.).

Figure 2:
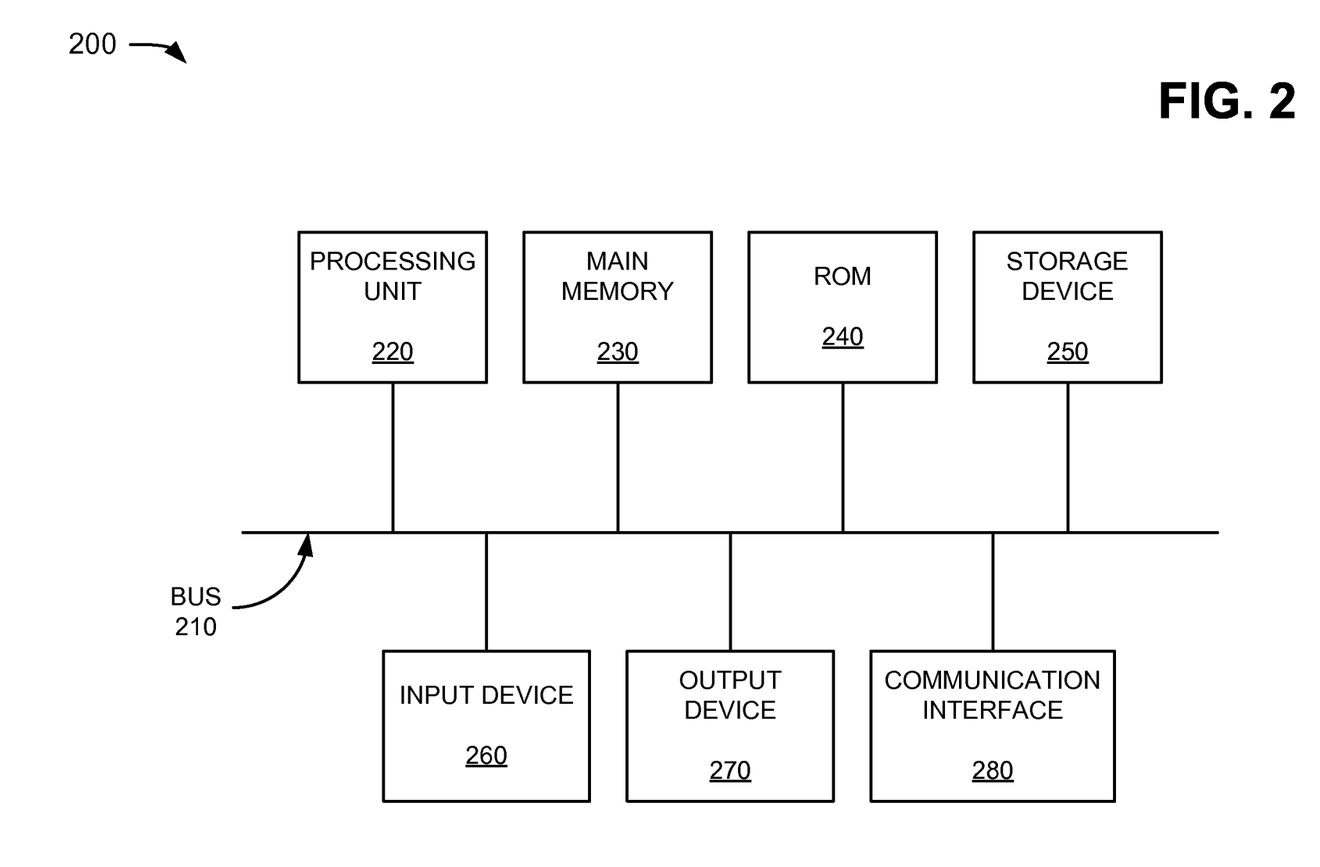
FIG. 2 is a diagram of example components of one or more devices of the network depicted in FIG. 1.

FIG. 2 is a diagram of example components of a device 200 that may correspond to one or more devices of network 100. As illustrated, device 200 may include a bus 210, a processing unit 220, a main memory 230, a read-only memory (ROM) 240, a storage device 250, an input device 260, an output device 270, and a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
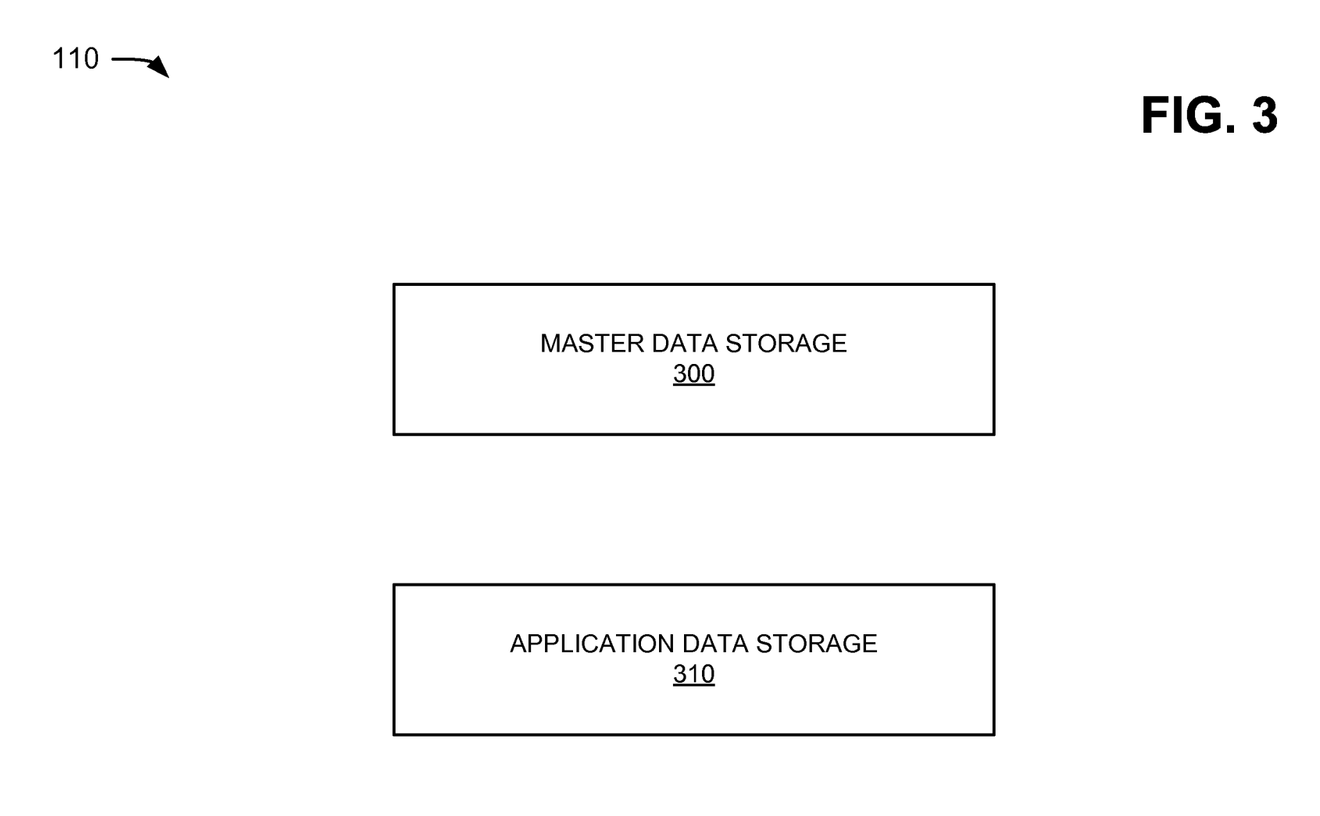
FIG. 3 is a diagram of example components of an enterprise resource planning (ERP) system illustrated in FIG. 1.

FIG. 3 is a diagram of example components of ERP system 110. In one implementation, the components of ERP system 110 depicted in FIG. 3 may be implemented by one or more components of device 200 (FIG. 2). As shown in FIG. 3, ERP system 110 may include master data storage 300 and application data storage 310.

Master data storage 300 may include one or more storage devices (e.g., storage device 250) that may consolidate, cleanse, synchronize, and/or store master data. The master data may include reference data, key business information, etc. The key business information may include data about customers, products, employees, materials, suppliers, etc., which may be non-transactional in nature. In this regard, the master data may support transactional processes and operations, but may also support analytics, reporting, etc. The master data may be used by several functional groups, may be stored in different data systems across an organization, and may or may not be referenced centrally. Master data storage 300 may distribute the master data internally and externally to ERP system 110. Master data storage 300 may receive the master data from an organization (e.g., from client systems), and may store the received master data.

Application data storage 310 may include one or more storage devices (e.g., storage device 250) that may receive application data (e.g., master data and transactional data), and may store the application data. The transactional data may include data describing an event (e.g., a change as a result of a transaction). The transactional data may include a time dimension, a numerical value, and may refer to one or more objects (e.g., reference data). For example, transactional data may include financial transactions (e.g., orders, invoices, payments, etc.); work plans; activity records; logistic transactions (e.g., deliveries, storage records, travel records, etc.), etc.

Although FIG. 3 shows example components of ERP system 110, in other implementations, ERP system 110 may contain fewer components, different components, differently arranged components, or additional components than depicted in FIG. 3. Alternatively, or additionally, one or more components of ERP system 110 may perform one or more other tasks described as being performed by one or more other components of ERP system 110.

Figure 4:
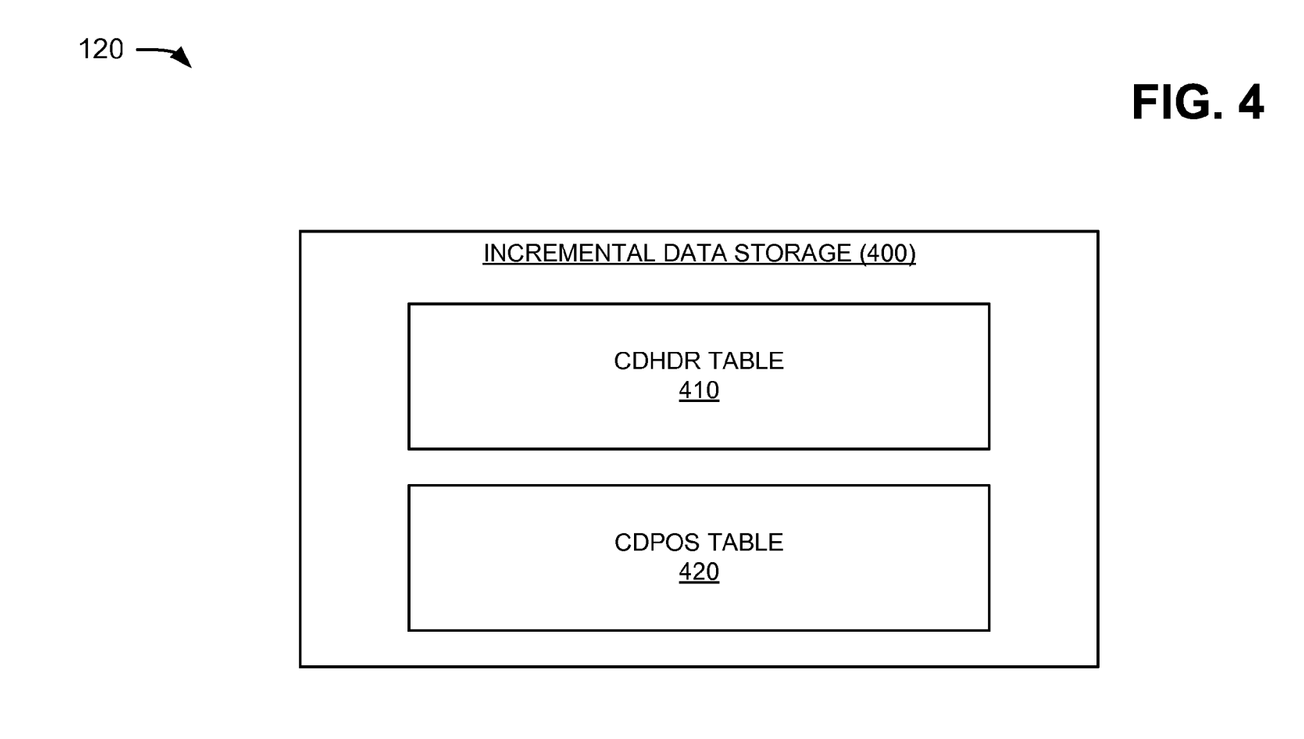
FIG. 4 is a diagram of example components of a change document service (CDS) system depicted in FIG. 1.

FIG. 4 is a diagram of example components of CDS system 120. In one implementation, the components of CDS system 120 depicted in FIG. 4 may be implemented by one or more components of device 200 (FIG. 2). As shown in FIG. 4, CDS system 120 may include incremental data storage 400 that includes a change document header (CDHDR) table 410 and a change document position (CDPOS) table 420.

When incremental data occurs (e.g., new data is created, data is deleted, or data is changed) in ERP system 110 over a particular time period, CDS system 120 may retrieve the incremental data and may store the incremental data in incremental data storage 400. Incremental data storage 400 may include one or more storage devices (e.g., storage device 250) that may receive incremental data from ERP system 110, and may store the incremental data. In one example implementation, incremental data storage 400 may store the incremental data in CDHDR table 410, CDPOS table 420, or other types of tables.

CDHDR table 410 may include a header or transparent table that stores incremental data (e.g., changed documents). CDHDR table 410 may store a large number of entries, and may assign a change identifier (ID) number (e.g., as a key) to each change. In one example, CDHDR table 410 may archive old incremental data to enable new incremental data to be inserted in CDHDR table 410.

CDPOS table 420 may include a cluster table that stores incremental data at an item level. CDPOS table 420 may store a large number of entries, and may assign a change ID number (e.g., as a key) to each change. In one example, CDPOS table 420 may archive old incremental data to enable new incremental data to be inserted in CDPOS table 420.

Although FIG. 4 shows example components of CDS system 120, in other implementations, CDS system 120 may contain fewer components, different components, differently arranged components, or additional components than depicted in FIG. 4. Alternatively, or additionally, one or more components of CDS system 120 may perform one or more other tasks described as being performed by one or more other components of CDS system 120.

Figure 5:
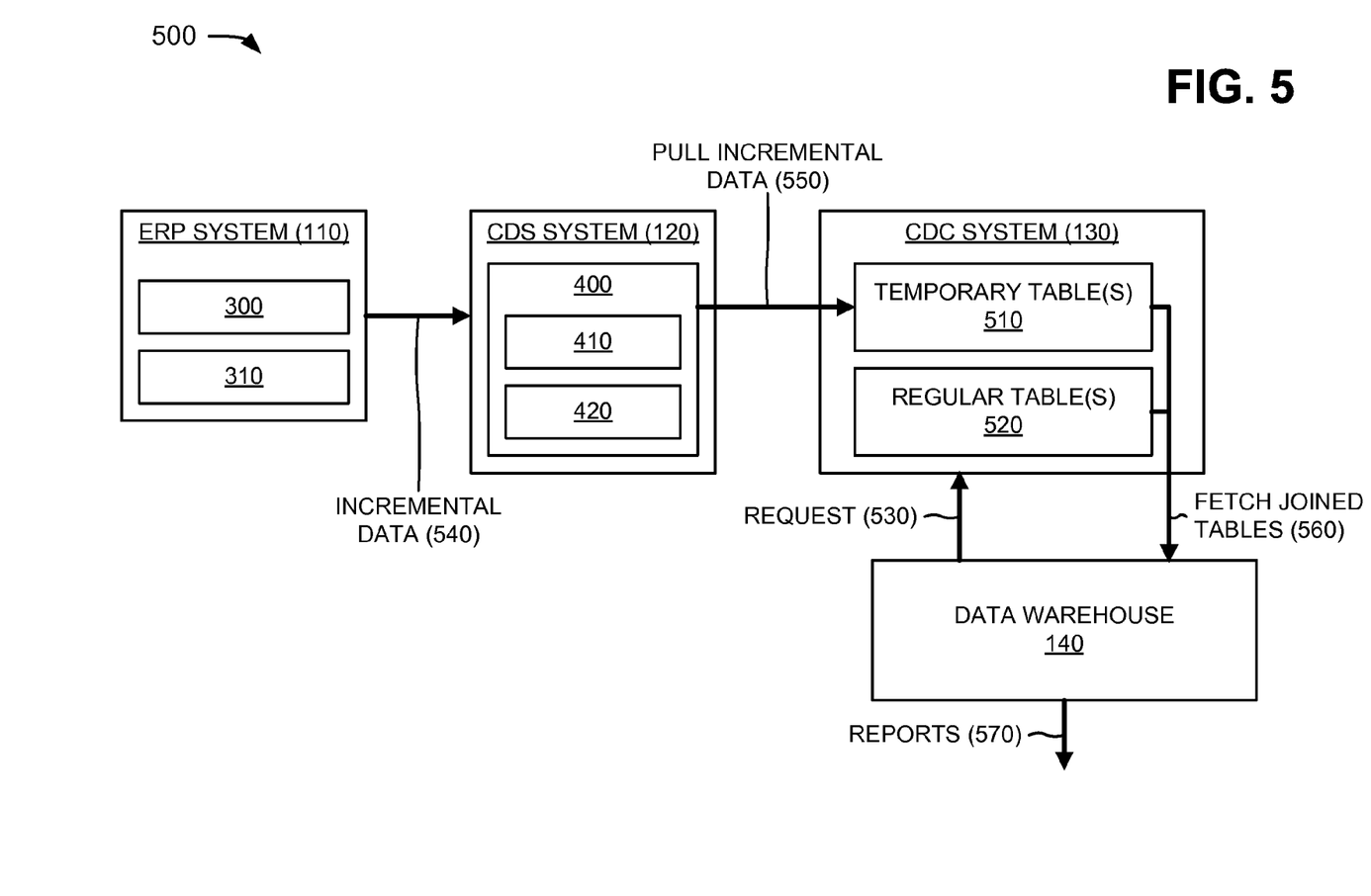
FIG. 5 is a diagram of example operations capable of being performed by an example portion of the network illustrated in FIG. 1.

FIG. 5 is a diagram of example operations capable of being performed by an example portion 500 of network 100. As shown, example network portion 500 may include ERP system 110, CDS system 120, CDC system 130, and data warehouse 140. ERP system 110, CDS system 120, CDC system 130, and data warehouse 140 may include the features described above in connection with, for example, one or more of FIGS. 1-4.

As further shown in FIG. 5, CDC system 130 may create one or more temporary tables 510 and one or more regular tables 520 provided in a storage device(s) (e.g., storage device 250) of CDC system 130. In one example, CDC system 130 may create a generic program (e.g., an ABAP Z program) to create temporary tables 510 (e.g., a ZTSCM_CONFIG_DT table). Temporary table(s) 510 may include tables (e.g., ABAP "Z configuration tables") that are temporarily created by CDC system 130 in order to temporarily store incremental data retrieved from CDS system 120, configuration entries for upload of incremental data, etc. Regular table(s) 520 may include tables that store data relevant to the incremental data provided in temporary table(s) 510. In one example implementation, temporary table(s) 510 and regular table(s) 520 may include Oracle staging tables.

In one example implementation, CDC system 130 may create a generic template to generate ABAP programs. The generic template may be used to input table names (e.g., standard SAP tables that may be used in change document history, such as CDHDR table 410 and CDPOS table 420); to obtain the change document history from the SAP tables; and to output the Z table (e.g., temporary table(s) 510) with updated change document data (e.g., incremental data).

CDC system 130 may receive, from data warehouse 140, a request 530 for incremental data. Request 530 may include a predetermined time period (e.g., a date range) for defining what is to be determined as incremental data. In one example implementation, request 530 may be provided to CDC system 130 via an extract, transform, and load (ETL) tool, such as an ODI. An ETL tool may extract data from outside sources, may transform the data to fit operational needs, and may load the data into an end target (e.g., data warehouse 140). CDC system 130 may create (e.g., based on request 530) one or more temporary tables 510 for storing incremental data. As further shown in FIG. 5, based on request 530 or prior to request 530 (e.g., when incremental data 540 occurs in ERP system 110), CDS system 120 may retrieve incremental data 540 from ERP system 110, and may store incremental data 540 in incremental data storage 400. In one example implementation, CDS system 120 may store incremental data 540 in CDHDR table 410, CDPOS table 420, or other types of tables provided in incremental data storage 400.

After creating temporary table(s) 510, CDC system 130 may extract or "pull" incremental data 540 from CDS system 120 (e.g., from incremental data storage 400), as indicated by reference number 550, and may store the extracted incremental data 540 in temporary table(s) 510. In one example implementation, CDC system 130 may create a "Z program" (e.g., a SAP ABAP program) to extract incremental data 540 from the SAP tracking tables (e.g., CDHDR table 410 and CDPOS table 420). CDC system 130 may generate a function call (e.g., a Remote Function Call (RFC), which is a SAP interface) to join temporary table(s) 510 with regular table(s) 520. In one example implementation, the function call (e.g., via SAP standard Function Modules (FMs)) may retrieve incremental data 540 from temporary table(s) 510, and may retrieve, from regular table(s) 520, particular data associated with the retrieved incremental data 540. The function call may then combine incremental data 540 with the particular data. For example, the function call may join fact and dimension information in table(s) 510 and 520 to obtain not only incremental data 540, but also all data associated with incremental data 540.

As further shown in FIG. 5, CDC system 130 may retrieve or "fetch" data from the joined temporary table(s) 510 and regular table(s) 520, as indicated by reference number 560. In one example implementation, the data from the joined temporary table(s) 510 and regular table(s) 520 may be extracted (e.g., by CDC system 130) with an ETL tool, such as an ODI. For example, CDC system 130 may reverse the Z table (e.g., temporary table(s) 510) in the ODI (e.g., metadata), may join fields in the Z table with regular SAP table columns, and may utilize the ODI to generate function modules for custom mappings. CDC system 130 may store (e.g., using Source Independent Loads (SILs)) the data from the joined temporary table(s) 510 and regular table(s) 520 in data warehouse 140, and may remove temporary table(s) 510.

In one example implementation, CDC system 130 may store the data from the joined temporary table(s) 510 and regular table(s) 520 in target tables provided in data warehouse 140. A record in a target table may have multiple columns where update logic may be different as mandated by business rules. CDC system 130 may permit setting a Slowly Changing Dimension (SCD) type (described below) for each field in the target table of data warehouse 140. For example, assume that data warehouse 140 stores both primary and secondary contact information of a vendor in the target tables. If a change occurs in the secondary contact information of the vendor, CDC system 130 may not maintain history for that change in the target tables. A user can set a property for the secondary contact information as "Overwrite on Change" within CDC system 130.

Data warehouse 140 may store the data from the joined temporary table(s) 510 and regular table(s) 520 in the target tables in a variety of ways. For example, data may be organized in data warehouse 140 in objects, such as dimensions and facts. The dimensions object may capture master data information, such as company information, plant/store information, supplier information, customer information, etc. The facts object may capture transactional data, such as purchase orders, stock movements, invoice information, etc. Data warehouse 140 may capture changes in data using a change data capture mechanism that updates or overwrites fields in the target table records (e.g., with incremental data 540), creates a new record (e.g., for incremental data 540, which preserves an old record), or uses a combination of the aforementioned techniques.

In one example implementation, CDC system 130 (e.g., via data warehouse 140) may insert, change, and delete data selected from CDHDR table 410 and CDPOS table 420 (e.g., category 1); may insert data selected from the joined temporary table(s) 510 and regular table(s) 520 and may change and delete data selected from CDHDR table 410 and CDPOS table 420 (e.g., category 2); may insert, change, and delete data selected from the joined temporary table(s) 510 and regular table(s) 520 (e.g., category 3); may change document records that include more than one object class (e.g., category 4); may utilize tables involved in hierarchy logic (e.g., category 5); may perform complex updates from the revenue, cost of goods sold (COGS), and bill of materials (BOM) functions (e.g., category 6); etc.

Within data warehouse 140, the techniques of the change data capture mechanism may also be described as SCD. SCD may include dimensions with data that slowly changes. SCD management methodologies may include a Type 0 method, a Type 1 method, and a Type 2 method. The Type 0 method may be a passive approach to managing dimension value changes, in which no action is taken. The Type 1 method may overwrite old data with new data, and may not track historical data. The Type 1 method may be used when correcting certain types of data errors, such as the spelling of a name. The Type 2 method may track historical data by creating multiple records in dimensional tables with separate keys. The Type 2 method may provide unlimited historical preservation since a new record may be inserted each time a change is made.

As further shown in FIG. 5, data warehouse 140 may generate one or more reports 570 based on the data from the joined temporary table(s) 510 and regular table(s) 520. Reports 570 may include, for example, reports used for decision support; trend analysis; financial forecasts; churn prediction for telecommunication subscribers, credit card users etc.; insurance fraud analysis; call record analysis; reports used for logistics and inventory management; etc. Alternatively, or additionally, data warehouse 140 may be accessed by an external analysis application, which may generate one or more reports 570. Although not shown in FIG. 5, in one example implementation, CDC system 130 may generate notifications (e.g., emails to multiple email addresses, text messages to cell phone numbers, etc.) that provide a status or progress of an incremental data capture from ERP system 110.

In one example (e.g., when ERP system 110 corresponds to a SAP system), CDC system 130 may perform the aforementioned tasks to populate data warehouse 140 with incremental data generated by the SAP system. For example, CDC system 130 may create a program that populates a table name and timestamp of data warehouse 140 into Z configuration table (e.g., ZTSCM_CONFIG_DT). Before pulling the incremental data load for a table of data warehouse 140, CDC system 130 may upload data within a range of dates (e.g., from a last extracted date to a current date of the SAP system) and the corresponding data warehouse 140 table name in the Z table. The created program may require two input parameters from the ODI open tool (e.g., the timestamp and table name of data warehouse 140).

CDC system 130 may populate a custom SAP table (e.g., a ZTSCM_CONFIG_FLD table), which may contain the SAP table and corresponding fields used to populate data warehouse 140 tables. In one example, fields included in the ZTSCM_CONFIG_FLD table may be tracked (e.g., by CDC system 130) as changes for the incremental upload.

CDC system 130 may create a Z program (e.g., ZSCM_INCREMENTAL_LOAD) that extracts the incremental data from CDHDR table 410 and CDPOS table 420. In one example, the Z program may extract the incremental data based on input parameters (e.g., SAP source tables used for populating data warehouse 140 table, data warehouse 140 table name, a last run date for the ODI interface to populate data warehouse 140 table) received from the ODI open tool. Once SAP tables are identified (e.g., based on dates provided in the ZTSCM_CONFIG_DT table), CDC system 130 may obtain the incremental data (e.g., I, U, D) for the identified SAP tables that are used to populate data warehouse 140 table from CDHDR table 410 and CDPOS table 420. Based on the ZTSCM_CONFIG_FLD table, CDC system 130 may identify changes made to specific table fields associated with the corresponding data warehouse 140 table. CDC system 130 may populate the incremental records into the respective Z SAP tables with a change indicator flag.

CDC system 130 may create programs for performing the incremental load. For example, CDC system 130 may create a program for uploading data warehouse 140 table and timestamp records into a configuration table (e.g., ZSCM_CONFIG_DT table); may create a program for uploading SAP tables and fields associated with each data warehouse 140 into a configuration table (e.g., ZSCM_CONFIG_FLD table); and may create a program (e.g., ZSCM_INCREMENTAL_LOAD) for extracting incremental data from CDHDR table 410 and CDPOS table 420.

ODI mappings may be used by CDC system 130 to populate the Z tables with the incremental data for all SAP tables used for populating data warehouse 140 table under the timestamp, and to process the SAP tables to obtain the incremental data for data warehouse 140 table. CDC system 130 may identify the SAP tables associated with CDHDR table 410 and CDPOS table 420 entries from a functional mapping of each data warehouse 140 table. For each table present in the change document history (e.g., provided in CDHDR table 410 and CDPOS 420), CDC system 130 may create a Z table in the SAP database table. These Z tables may be further used (e.g., by CDC system 130) in the mapping to extract the incremental load for a given data warehouse 140 table.

In a first example, an interface of CDC system 130 may be used to remove header records with a flag (e.g., a CHNGIND flag) set to "I." To remove header records, CDC system 130 interface may use a filter (e.g., ZTCONFIG_DATE.INTERFACE='W_PURCH_ORDER_FS'); a first join (e.g., (INNER JOIN) ZTCONFIG_DATE.ZDATE=EKKO.AEDAT); a second join (e.g., (LOJ) EKKO.EBELN=EKPO.EBELN); and a third join (e.g., (LOJ) EKPO.EBELN=EKET.EBELN AND EKPO.EBELP=EKET.EBELP).

In a second example, an interface of CDC system 130 may be used to remove header records with a flag (e.g., a CHNGIND flag) set to "U" or "D." To remove header records, CDC system 130 interface may use a first filter (e.g., ZTCONFIG_DATE.INTERFACE='W_PURCH_ORDER_FS'); a second filter (e.g., ZTOBI_CONFIG.SRCTABLE='EKKO' AND ZTOBI_CONFIG.TRGTABLE='W_PURCH_ORDER'); a first join (e.g., (INNER JOIN) ZTCONFIG_DATE.ZDATE=ZOBI_EKKO.UDATE AND ZTCONFIG_DATE.INTERFACE=ZOBI_EKKO.INTERFACE); a second join (e.g., ZOBI_EKKO.FNAME=ZTOBI_CONFIG.FIELDNAME); a third Join (e.g., (INNER JOIN) ZOBI_EKKO.EBELN=EKKO.EBELN); a fourth join (e.g., (INNER JOIN) EKKO.EBELN=EKPO.EBELN; and a fifth join (e.g., (LOJ) EKPO.EBELN=EKET.EBELN AND EKPO.EBELP=EKET.EBELP).

In a third example, an interface of CDC system 130 may be used to remove first line item records with a flag (e.g., a CHNGIND flag) set to "I," "U," or "D." To remove first line item records, CDC system 130 interface may use a first filter (e.g., ZTCONFIG_DATE.INTERFACE='W_PURCH_ORDER_FS'); a second filter (e.g., ZTOBI_CONFIG.SRCTABLE='EKPO' AND ZTOBI_CONFIG.TRGTABLE='W_PURCH_ORDER'); a first join (e.g., (INNER JOIN) ZTCONFIG_DATE.ZDATE=ZOBI_EKPO.UDATE AND ZTCONFIG_DATE.INTERFACE=ZOBI_EKPO.INTERFACE); a second join (e.g., (INNER JOIN) ZOBI_EKKO.FNAME=ZTOBI_CONFIG.FIELDNAME); a third join (e.g., (INNER JOIN) ZOBI_EKPO.EBELN=EKPO.EBELN AND ZOBI_EKPO.EBELP=EKPO.EBELP); a fourth join (e.g., (INNER JOIN) EKPO.EBELN=EKKO.EBELN); and a fifth join (e.g., (LOJ) (EKPO.EBELN=EKET.EBELN) AND EKPO.EBELP=EKET.EBELP).

In a fourth example, an interface of CDC system 130 may be used to remove maximum timestamp records based on the following condition:
TO_CHAR(MAX(TO_TIMESTAMP(W_PURCH_ORDER_FS_1.UDATE|W_PURCH_ORDER_FS_1.UTIME, 'YYYYMMDDHH24:MI:SS')), 'YYYYMMDDHH24:MI:SS').

In a fifth example, an interface of CDC system 130 may be used to join a first temporary table (e.g., a maximum records table) with a second temporary table to obtain full length records. To join the first and second temporary tables, CDC system 130 interface may use a first join, such as, for example:
(INNER JOIN) W_PURCH_ORDER_FS_1.EBELN=W_PURCH_ORDER_FS_2.EBELN AND DECODE(W_PURCH_ORDER_FS_1.EBELP,NULL, 'NA',W_PURCH_ORDER_FS_1.EBELP)=DECODE (W_PURCH_ORDER_FS_2.EBELP,NULL,'NA', W_PURCH_ORDER_FS_2.EBELP) AND TO_TIMESTAMP(W_PURCH_ORDER_FS_1.UDATE|W_PURCH_ORDER_FS_1.UTIME, 'YYYYMMDDHH24:MI:SS')=TO_TIMESTAMP (W_PURCH_ORDER_FS_2.MAX_TIMESTAMP, 'YYYYMMDDHH24:MI:SS').

In a sixth example, an interface of CDC system 130 may be used for populating with a record (e.g., W_PURCH_ORDER_FS). To populate with the record, CDC system 130 interface may use first Join (e.g., (LO) (W_PURCH_ORDER_FS_3.BANFN=EBAN.BANFN) AND W_PURCH_ORDER_FS_3.BNFPO=EBAN.BNFPO); a second join (e.g., (LOJ) (W_PURCH_ORDER_FS_3.MATNR=MBEW.MATNR) AND W_PURCH_ORDER_FS_3.WERKS=MBEW.BWKEY); and a third join (e.g., (LOJ) W_PURCH_ORDER_FS_3.BUKRS=T001.BUKRS).

CDC system 130 may enable reuse of the same source Z tables for populating incremental data in multiple target data warehouse 140 tables, and may not need to create Z tables manually for each target table in data warehouse 140. CDC system 130 may also require less dependency on SAP ABAP skills for modifying/changing mappings since any new target table (e.g., in data warehouse 140) may be easily processed for incremental data.

To add a new SAP table, CDC system 130 may identify a category for the SAP table (e.g., one of categories 1-6, described above). For categories 1-3, CDC system 130 may update fields in a configuration table for the newly added SAP table, such as: a SAP source tables fields (e.g., CDC system 130 may add the new SAP table name as a comma separated value with existing tables); and fields to be used from new SAP table (e.g., CDC system 130 may add new fields from the newly added table as a comma separated value in the configuration table). These values may be automatically retrieved by the template program in a subsequent run. CDC system 130 may also define interfaces for processing the new SAP table and its fields, as described above in the previous examples.

For categories 4-6, CDC system 130 may update an ABAP Z program that is fetching the incremental data. If the newly added SAP table is a simple text table, CDC system 130 may not update the Z program, but may join the Z table in the ODI interface based on key values provided in the Z table. CDC system 130 may also update existing interfaces and add the new SAP table in the interfaces for processing incremental data, as shown above in the previous examples. If the new SAP table includes a one-to-one mapping with a target table, CDC system 130 may pass the fields of the newly added SAP table to the target table (e.g., via a calculation, if any, performed in the ODI interfaces).

To add a new field to a SAP table, CDC system 130 may identify a category for the SAP table (e.g., one of categories 1-6, described above). For categories 1-3, CDC system 130 may update fields in the configuration table (e.g., for the newly added fields) from an existing table. For example, CDC system 130 may add the new fields from the existing table (e.g., CDC system 130 may add the new fields as a comma separated value in the configuration table). These values may be automatically retrieved by the template program in a subsequent run. CDC system 130 may also modify interfaces for mapping the new fields to the target table. If the new fields include a one-to-one mapping with target fields, CDC system 130 may map the new fields (e.g., via a calculation, if any, performed in the ODI interfaces).

For categories 4-6, CDC system 130 need not update an ABAP Z program (e.g., since the table for the new entries already exists), may update existing interfaces, and may map the new fields from the source table to the target table. If the new fields include a one-to-one mapping with the target table fields, CDC system 130 may pass the new fields to the target table (e.g., via a calculation, if any, performed in the ODI interfaces).

In today's business environment, decisions by business users may need to be based on information that is refreshed hourly, every minute, or even every second. For example, creation of a new vendor or shipment of an order may reflect important real world events. By capturing data changes related to such business events, CDC system 130 may serve as a focal point for driving continuous, event-based data integration. CDC system 130 may provide visibility to critical business events as they occur, may bridge distinct technologies (e.g., SAP and Oracle), and may enable reporting across ERP system 110 and data warehouse 140 in a cost effective way (e.g., without use of complex and expensive ERP system tools and techniques).

Although FIG. 5 shows example components of network portion 500, in other implementations, network portion 500 may contain fewer components, different components, differently arranged components, or additional components than depicted in FIG. 5. Alternatively, or additionally, one or more components of network portion 500 may perform one or more other tasks described as being performed by one or more other components of network portion 500.

Figure 6:
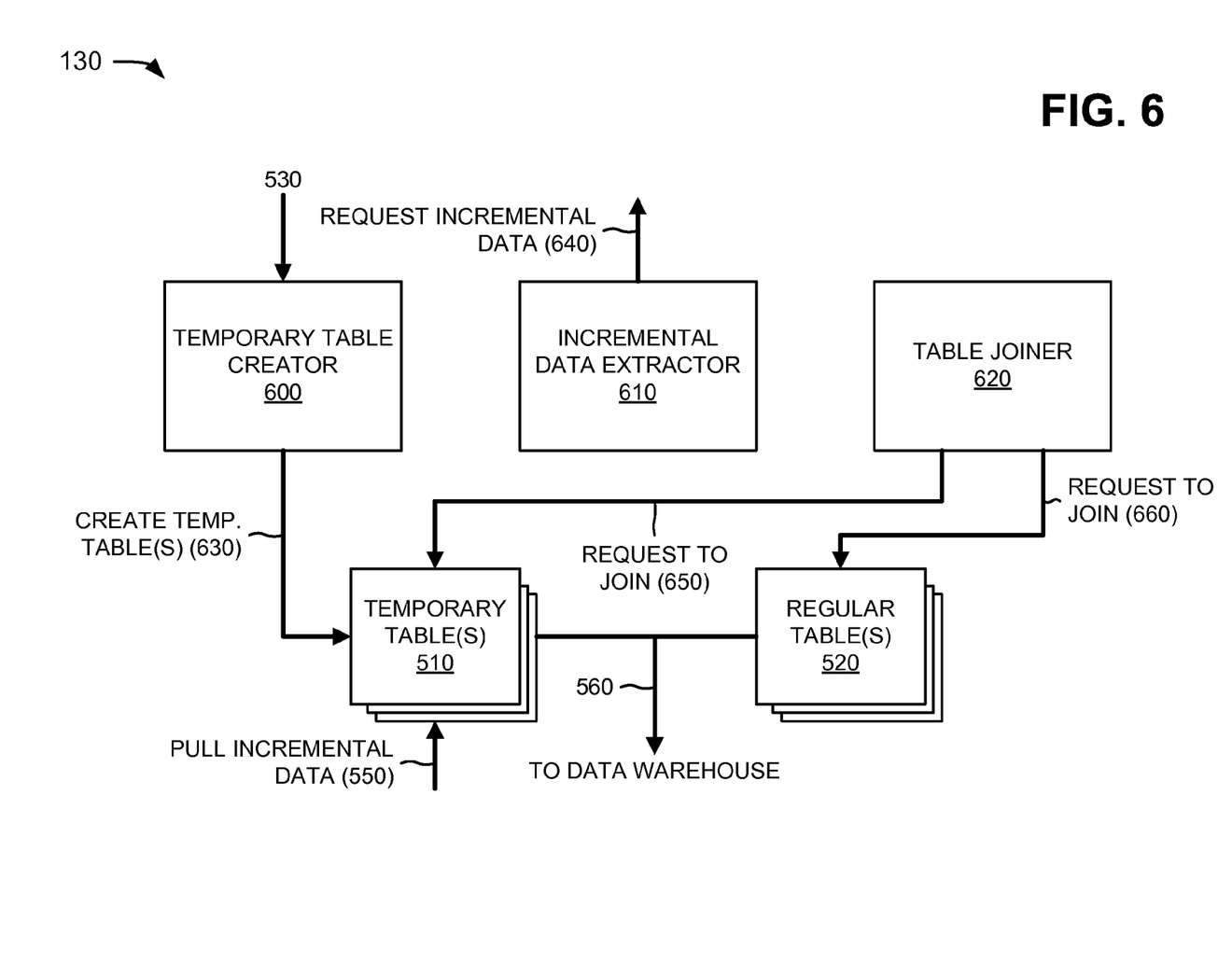
FIG. 6 is a diagram of example functional components of a change data capture (CDC) system depicted in FIGS. 1 and 5.

FIG. 6 is a diagram of example functional components of CDC system 130. In one implementation, the functions described in connection with FIG. 6 may be performed by one or more components of device 200 (FIG. 2). As illustrated in FIG. 6, CDC system 130 may include temporary table(s) 510, regular table(s) 520, a temporary table creator 600, an incremental data extractor 610, and a table joiner 620. Temporary table(s) 510 and regular table(s) 520 may include the features described above in connection with, for example, FIG. 5.

Temporary table creator 600 may include hardware or a combination of hardware and software that may receive request 530 for incremental data from data warehouse 140, and may create (e.g., based on request 530) one or more temporary tables 510 for storing incremental data, as indicated by reference number 630.

Incremental data extractor 610 may include hardware or a combination of hardware and software that may (e.g., after creation of temporary table(s) 510) generate a request 640 for incremental data, and may provide request 640 to CDS system 120. Request 640 may cause CDC system 130 to extract or "pull" incremental data 540 from CDS system 120 (e.g., from incremental data storage 400), as indicated by reference number 550, and to store the extracted incremental data 540 in temporary table(s) 510. In one example implementation, request 640 may include a "Z program" (e.g., a SAP ABAP program) that extracts incremental data 540 from the SAP tracking tables (e.g., CDHDR table 410 and CDPOS table 420).

Table joiner 620 may include hardware or a combination of hardware and software that may generate a function call (e.g., a RFC) that provides a request to join 650 to temporary table(s) 510 and another request to join 660 to regular table(s) 520. In one example implementation, requests to join 650/660 may enable CDC system 130 to retrieve incremental data 540 from temporary table(s) 510, and retrieve, from regular table(s) 520, particular data associated with the retrieved incremental data 540. The function call may then combine incremental data 540 with the particular data. For example, the function call may join fact and dimension information in table(s) 510 and 520 to obtain not only incremental data 540, but also all relevant data that goes along with incremental data 540.

As further shown in FIG. 6, CDC system 130 may retrieve data from the joined temporary table(s) 510 and regular table(s) 520, as indicated by reference number 560. CDC system 130 may store (e.g., using SILs) the data from the joined temporary table(s) 510 and regular table(s) 520 in data warehouse 140, and may remove temporary table(s) 510.

Although FIG. 6 shows example functional components of CDC system 130, in other implementations, CDC system 130 may contain fewer functional components, different functional components, differently arranged functional components, or additional functional components than depicted in FIG. 6. Alternatively, or additionally, one or more functional components of CDC system 130 may perform one or more other tasks described as being performed by one or more other functional components of CDC system 130.

Figure 7:
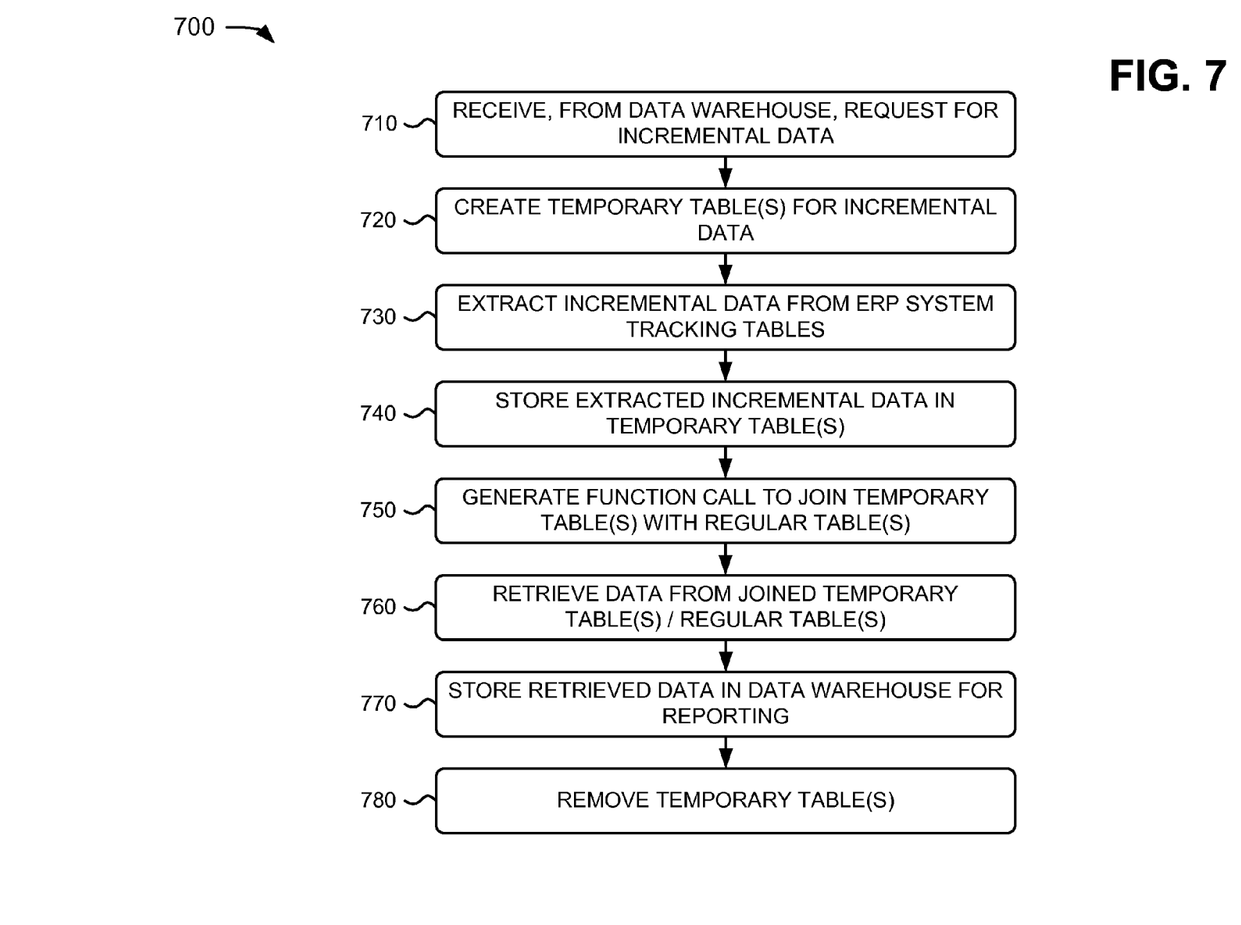
FIGS. 7-9 are flow charts of an example process for providing change data capture for ERP systems according to implementations described herein.
Figure 8:
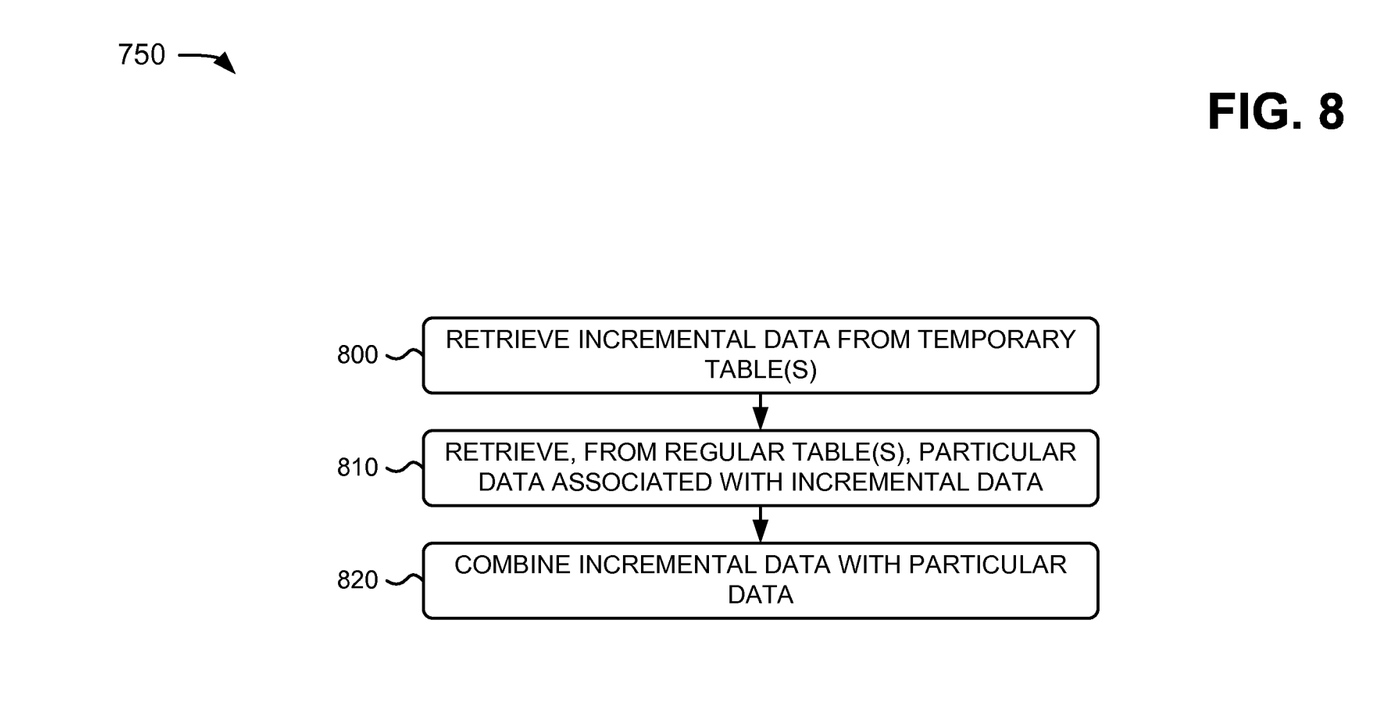
Figure 9:
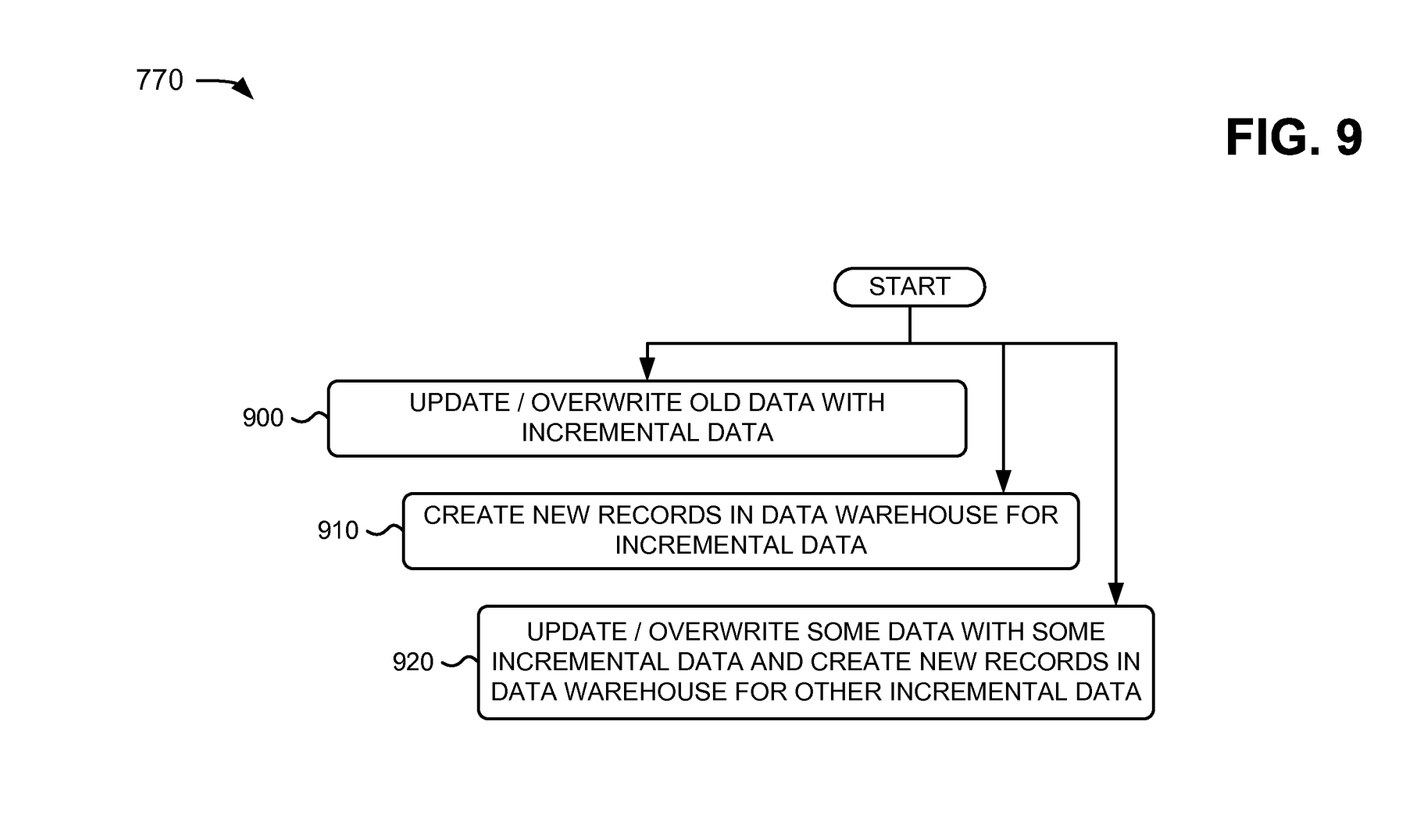

FIGS. 7-9 are flow charts of an example process 700 for providing change data capture for ERP systems according to implementations described herein. In one implementation, process 700 may be performed by CDC system 130. In another implementation, some or all of process 700 may be performed by another device or group of devices, including or excluding CDC system 130.

As shown in FIG. 7, process 700 may include receiving, from a data warehouse, a request for incremental data (block 710), and creating temporary table(s) for incremental data (block 720). For example, in implementations described above in connection with FIG. 5, CDC system 130 may receive, from data warehouse 140, request 530 for incremental data. Request 530 may include a predetermined time period (e.g., a date range) for defining what is to be determined as incremental data. In one example, request 530 may be provided to CDC system 130 via an ETL tool, such as an ODI. CDC system 130 may create (e.g., based on request 530) one or more temporary tables 510 for storing incremental data. Temporary table(s) 510 may include tables (e.g., ABAP "Z tables") that are temporarily created by CDC system 130 in order to temporarily store incremental data retrieved from CDS system 120.

As further shown in FIG. 7, process 700 may include extracting incremental data from ERP system tracking tables (block 730), and storing the extracted incremental data in the temporary table(s) (block 740). For example, in implementations described above in connection with FIG. 5, after creating temporary table(s) 510, CDC system 130 may extract or "pull" incremental data 540 from CDS system 120 (e.g., from incremental data storage 400), as indicated by reference number 550, and may store the extracted incremental data 540 in temporary table(s) 510. In one example, CDC system 130 may create a "Z program" (e.g., a SAP ABAP program) to extract incremental data 540 from the SAP tracking tables (e.g., CDHDR table 410 and CDPOS table 420).

Returning to FIG. 7, process 700 may include generating a function call to join the temporary table(s) with regular table(s) (block 750), and retrieving the data from the joined temporary table(s) and the regular table(s) (block 760). For example, in implementations described above in connection with FIG. 5, CDC system 130 may generate a function call (e.g., a RFC) to join temporary table(s) 510 with regular table(s) 520. CDC system 130 may retrieve or "fetch" data from the joined temporary table(s) 510 and regular table(s) 520, as indicated by reference number 560. In one example, the data from the joined temporary table(s) 510 and regular table(s) 520 may be extracted (e.g., by CDC system 130) with an ETL tool, such as an ODI.

As further shown in FIG. 7, process 700 may include storing the retrieved data in the data warehouse for reporting (block 770), and removing the temporary table(s) (block 780). For example, in implementations described above in connection with FIG. 5, CDC system 130 may store (e.g., using SILs) the data from the joined temporary table(s) 510 and regular table(s) 520 in data warehouse 140, and may remove temporary table(s) 510. In one example, CDC system 130 may store the data from the joined temporary table(s) 510 and regular table(s) 520 in target tables provided in data warehouse 140.

Process block 750 may include the process blocks depicted in FIG. 8. As shown in FIG. 8, process block 750 may include retrieving incremental data from the temporary table(s) (block 800), retrieving, from the regular table(s) particular data associated with the incremental data (block 810), and combining the incremental data with the particular data (block 820). For example, in implementations described above in connection with FIG. 5, CDC system 130 may generate a function call (e.g., a RFC) to join temporary table(s) 510 with regular table(s) 520. In one example, the function call (e.g., via SAP standard FMs) may retrieve incremental data 540 from temporary table(s) 510, and may retrieve, from regular table(s) 520, particular data associated with the retrieved incremental data 540. The function call may then combine incremental data 540 with the particular data. For example, the function call may join fact and dimension information in table(s) 510 and 520 to obtain not only incremental data 540, but also all data associated with incremental data 540.

Process block 770 may include the process blocks depicted in FIG. 9. As shown in FIG. 9, process block 770 may include updating or overwriting old data with the incremental data (block 900), creating new records in the data warehouse for the incremental data (block 910), or updating/overwriting some data with some of the incremental data and creating new records in the data warehouse for other incremental data (block 920). For example, in implementations described above in connection with FIG. 5, data warehouse 140 may capture changes in data using a change data capture mechanism that updates or overwrites fields in the target table records (e.g., with incremental data 540), creates a new record (e.g., for incremental data 540, which preserves an old record), or uses a combination of the aforementioned techniques.

Systems and/or methods described herein may provide a change (or incremental) data capture system (e.g., for an ERP system) that extracts information (e.g., incremental data) from the ERP system on an as needed basis and populates a data warehouse with the extracted information. The data warehouse may utilize the extracted information to create specific reports and/or analytics that provide up-to-date information to businesses and enables them to make prompt decisions. The ERP system (e.g., a source system) may have data (e.g., incremental data) that has changed from a previous point in time, and the data warehouse (e.g., a target system or reporting system) may need to take action based on the changed data. The systems and/or methods may provide a link between the source system (e.g., the ERP system) and the target system (e.g., the data warehouse) so that the target system may reflect the newest up-to-date data from the source system.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device and from a data warehouse, a request for incremental data associated with a particular period of time, wherein the incremental data comprises data that is created, changed or deleted in an enterprise resource planning (ERP) system over the particular period of time;
   creating, by the computing device, one or more temporary tables based on the request;
   extracting, by the computing device, incremental data from tracking tables of the ERP system;
   storing, by the computing device, the extracted incremental data in the one or more temporary tables;
   generating, by the computing device, a function call to join the one or more temporary tables with one or more regular tables, wherein the one or more regular tables include data associated with the incremental data stored in the one or more temporary tables;
   retrieving, by the computing device, data from the joined one or more temporary tables and the one or more regular tables; and
   storing, by the computing device, the retrieved data in the data warehouse, wherein, in response to the function call to join the one or more temporary tables with one or more regular tables, the method further comprises:
   retrieving the incremental data from the one or more temporary tables;
   retrieving, from the one or more regular tables, particular data associated with the incremental data; and
   combining the incremental data with the particular data.

2. The method of claim 1, where extracting incremental data comprises:
   extracting the incremental data from the tracking tables of the ERP system according to a predetermined schedule.

3. The method of claim 1, wherein extracting incremental data comprises:
   creating an Advanced Business Application Programming (ABAP) program that extracts the incremental data from the tracking tables of the ERP system.

4. The method of claim 1, where the function call includes a Remote Function Call (RFC).

5. The method of claim 1, further comprising:
   generating one or more notifications that provide a status of the extracting the incremental data from the tracking tables of the ERP system.

6. The method of claim 1, further comprising:
   removing the one or more temporary tables after storing the retrieved data in the data warehouse.

7. The method of claim 1, where storing the retrieved data in the data warehouse comprises at least one of:
   updating records in the data warehouse with the retrieved data;
   creating new records in the data warehouse for the retrieved data; or
   updating some records in the data warehouse with a portion of the retrieved data and creating new records in the data warehouse for another portion of the retrieved data.

8. The method of claim 1, where the computing device comprises a change data capture (CDC) system.

9. A computing device, comprising:
   a memory to store a plurality of instructions; and
   a processor configured to execute instructions in the memory to:
      receive, from a data warehouse, a request for incremental data associated with a particular period of time, wherein the incremental data comprises data that is created, changed or deleted in an enterprise resource planning (ERP) system over the particular period of time,
      create one or more temporary tables based on the request,
      extract incremental data from tracking tables of the ERP system,
      store the extracted incremental data in the one or more temporary tables,
      join, via a function call, the one or more temporary tables with one or more regular tables, wherein the one or more regular tables include data associated with the incremental data stored in the one or more temporary tables,
      retrieve data from the joined one or more temporary tables and the one or more regular tables, and
      store the retrieved data in the data warehouse,
   wherein, when joining the one or more temporary tables with one or more regular tables, the processor is configured to:
      retrieve the incremental data from the one or more temporary tables,
      retrieve, from the one or more regular tables, particular data associated with the incremental data, and
      combine the incremental data with the particular data.

10. The computing device of claim 9, wherein, when extracting incremental data, the processor is further configured to execute instructions in the memory to:
    extract the incremental data from the tracking tables of the ERP system according to a predetermined schedule.

11. The computing device of claim 9, wherein, when extracting incremental data, the processor is further to execute instructions in the memory to:
    create an Advanced Business Application Programming (ABAP) program that extracts the incremental data from the tracking tables of the ERP system.

12. The computing device of claim 9, wherein the processor is further configured to execute instructions in the memory to:
    generate one or more notifications that provide a status of the extracting the incremental data from the tracking tables of the ERP system.

13. The computing device of claim 9, wherein the processor is further configured to execute instructions in the memory to:
    remove the one or more temporary tables after storing the retrieved data in the data warehouse.

14. The computing device of claim 9, wherein the instructions further cause the process to generate a function call to join the one or more temporary tables with one or more regular tables.

15. The computing device of claim 9, wherein, when storing the retrieved data in the data warehouse, the processor is further configured to execute instructions in the memory to at least one of:

update records in the data warehouse with the retrieved data, create new records in the data warehouse for the retrieved data, or update some records in the data warehouse with a portion of the retrieved data and create new records in the data warehouse for another portion of the retrieved data.

16. The computing device of claim 9, where the computing device comprises a change data capture (CDC) system.

17. One or more non-transitory computer-readable media storing instructions executable by one or more processors, the media storing one or more instructions for:

receiving, from a data warehouse, a request for incremental data, wherein the incremental data comprises data that is created, changed or deleted in an enterprise resource planning (ERP) system over a particular period of time;

creating one or more temporary tables based on the request;

extracting incremental data from tracking tables of the ERP system;

storing the extracted incremental data in the one or more temporary tables;

generating a function call to join the one or more temporary tables with one or more regular tables, wherein the one or more regular tables include data associated with the incremental data stored in the one or more temporary tables;

retrieving data from the joined one or more temporary tables and the one or more regular tables;

storing the retrieved data in the data warehouse; and removing the one or more temporary tables after storing the retrieved data in the data warehouse.

\* \* \* \* \*